US009063667B2

(12) United States Patent
Ancajas et al.

(10) Patent No.: US 9,063,667 B2
(45) Date of Patent: Jun. 23, 2015

(54) DYNAMIC MEMORY RELOCATION

(71) Applicants: Dean Michael Ancajas, Logan, UT (US); Koushik Chakraborty, Logan, UT (US); Sanghamitra Roy, Logan, UT (US)

(72) Inventors: Dean Michael Ancajas, Logan, UT (US); Koushik Chakraborty, Logan, UT (US); Sanghamitra Roy, Logan, UT (US)

(73) Assignee: Utah State University, North Logan, UT (US)

( * ) Notice: Subject to any disclaimer, the term of this patent is extended or adjusted under 35 U.S.C. 154(b) by 26 days.

(21) Appl. No.: 14/056,690

(22) Filed: Oct. 17, 2013

(65) Prior Publication Data
US 2015/0052327 A1 Feb. 19, 2015

Related U.S. Application Data

(60) Provisional application No. 61/865,298, filed on Aug. 13, 2013.

(51) Int. Cl.
*G06F 12/00* (2006.01)
*G06F 3/06* (2006.01)
*G06F 13/00* (2006.01)

(52) U.S. Cl.
CPC ............ *G06F 3/0647* (2013.01); *G06F 3/0604* (2013.01); *G06F 3/0638* (2013.01); *G06F 3/0683* (2013.01)

(58) Field of Classification Search
CPC .................................. G06F 12/00; G06F 13/00
USPC ...................................... 711/161–162; 710/62
See application file for complete search history.

(56) References Cited

U.S. PATENT DOCUMENTS

| | | | |
|---|---|---|---|
| 6,453,408 B1* | 9/2002 | Fiske et al. | 712/29 |
| 7,707,456 B2* | 4/2010 | Tanaka et al. | 714/6.11 |
| 8,205,112 B2* | 6/2012 | Sakaguchi et al. | 714/2 |
| 8,429,667 B2* | 4/2013 | Ogawa et al. | 718/105 |
| 8,447,941 B2* | 5/2013 | Kono et al. | 711/162 |
| 8,751,864 B2* | 6/2014 | Swanson et al. | 714/6.32 |
| 2007/0011420 A1* | 1/2007 | Boss et al. | 711/165 |
| 2007/0234112 A1* | 10/2007 | Thayer et al. | 714/8 |
| 2009/0044035 A1* | 2/2009 | Taguchi et al. | 713/340 |
| 2010/0250883 A1* | 9/2010 | Oshida | 711/162 |
| 2011/0320847 A1* | 12/2011 | Cheung et al. | 713/340 |
| 2014/0281149 A1* | 9/2014 | Roberts et al. | 711/103 |
| 2014/0366030 A1* | 12/2014 | Solihin | 718/100 |

OTHER PUBLICATIONS

Abts, D., et al., Achieving predictable performance through better memory controller placement in many-core CMPs, ISCA '09, Proceedings of the 36th Annual International Symposium on Computer Architecture, 2009, p. 451-461.

(Continued)

*Primary Examiner* — Christopher Shin

(57) ABSTRACT

For dynamic memory relocation, a tracking module tracks accesses to a plurality of memory devices. Each of the plurality of memory devices is in communication with one memory controller of a plurality of memory controllers embedded in a computing device comprising a plurality of nodes. A migration module migrates first data from a first memory device in communication with a first memory controller to a second memory device in communication with a second memory controller.

17 Claims, 7 Drawing Sheets

(56) References Cited

OTHER PUBLICATIONS

Antony, J., et al., Exploring thread and memory placement on NUMA architectures: solaris and linux, UltraSPARC/FirePlane and opteron/hypertransport, HiPC'06 Proceedings of the 13th International Conference on High Performance Computing, 2006, p. 338-352.

Chang, J., et al., Cooperative cache partitioning for chip multiprocessors, ICS '07 Proceedings of the 21st annual international conference on Supercomputing, 2007, p. 242-252.

Das, S., et al., Technology, performance, and computer-aided design of three-dimensional integrated circuits, ISPD '04 Proceedings of the 2004 international symposium on Physical design, 2004, p. 108-115.

Dong, X., et al., Simple but Effective Heterogeneous Main Memory with On-Chip Memory Controller Support, SC '10 Proceedings of the 2010 ACM/IEEE International Conference for High Performance Computing, Networking, Storage and Analysis, 2010, p. 1-11.

Gupta, S., et al., Techniques for producing 3D ICs with high-density interconnect, IEEE VMIC 2004 finalsecure, 2004, p. 1-5.

Henning, J., SPEC CPU2006 benchmark descriptions, Sigarch Computer Architecture News, 2006, p. 1-17.

Holden, B., Latency comparison between HyperTransport and PCI-Express in communications systems, White Paper, HyperTransport Consortium Technical Group, 2006, p. 1-11.

Li, S., et al., McPAT: An integrated power, area, and timing modeling framework for multicore and manycore architectures, Microarchitecture, 42nd Annual IEEE/ACM International Symposium, 2009, p. 469-480.

Liu, C., et al., Bridging the processor-memory performance gap with 3D IC technology, Esign & Test of Computers, IEEE, 2005, vol. 22, iss. 6, p. 556-564.

Loh, G.H., 3D-Stacked Memory Architectures for Multi-core Processors, Computer Architecture, ISCA '08 35th International Symposium, 2008, p. 453-464.

Loi, G.L., et al., A thermally-aware performance analysis of vertically integrated (3-D) processor-memory hierarchy, Design Automation Conference, 43rd ACM/IEEE, 2006, p. 991-996.

Magnusson, P.S., et al., Simics: A full system simulation platform, Computer, 2002, vol. 35, iss. 2, p. 50-58.

Marathe, J., et al., Hardware profile-guided automatic page placement for ccNUMA systems, PPoPP '06 Proceedings of the eleventh ACM SIGPLAN symposium on Principles and practice of parallel programming, 2006, p. 90-99.

McCormick, P., et al., Empirical memory access cost models in multicore numa architectures, International Conference on Parallel Processing, 2011.

Rosenfeld, P., et al., DRAMSim2: A Cycle Accurate Memory System Simulator, Computer Architecture Letters, 2011, vol. 10, iss. 1, p. 16-19.

Sudan, K., et al., Micro-pages: increasing DRAM efficiency with locality-aware data placement, ACM SIGPLAN Notices—ASPLOS '10, 2010, vol. 45, iss. 3, p. 219-230.

Tikir, M., et al., Using hardware counters to automatically improve memory performance, SC '04 Proceedings of the 2004 ACM/IEEE conference on Supercomputing, 2004, p. 46.

Wentzlaff, D., et al., On-Chip interconnection architecture of the tile processor, IEEE Micro, 2007, vol. 27, iss. 5, p. 15-31.

Zhang, M., et al., Victim replication: maximizing capacity while hiding wire delay in tiled chip multiprocessors, ISCA '05 Proceedings of the 32nd annual international symposium on Computer Architecture, 2005, p. 336-345.

Muralimanohar, N., et al., Cacti 6.0: A tool to understand large caches, University of Utah, School of Computing, Technical Report, 2007.

Micron Technology Inc., Micron DDR3 SDRAM, part MT41J128M16, 2006.

Tezzaron, FaStack creates 3D integrated circuits, http://www.tezzaron.com/technology/FaStack.htm, retrieved Dec. 30, 2013.

* cited by examiner

225 ↘

| MC ID 295 | Memory Address 240 |

| Bank ID 255 | Row ID 260 | Column ID 265 | Byte Offset 270 |

| | Node/MC ID 215 | Access Type 220 | Data Address 225 | Access Count 230 |
|---|---|---|---|---|
| 235a | Node/MC ID 215 | Access Type 220 | Data Address 225 | Access Count 230 |
| 235b | Node/MC ID 215 | Access Type 220 | Data Address 225 | Access Count 230 |
| 235c | Node/MC ID 215 | Access Type 220 | Data Address 225 | Access Count 230 |
| 235d | Node/MC ID 215 | Access Type 220 | Data Address 225 | Access Count 230 |

FIG. 6

DYNAMIC MEMORY RELOCATION

CROSS-REFERENCE TO RELATED APPLICATIONS

This application claims priority to Provisional Patent Application No. 61/865,298 entitled "Dynamic Memory Relocation" and filed on Aug. 13, 2013 for Dean Michael Ancajas et al., which is incorporated herein by reference.

This invention was made with government support under contract CNS-1117425 and CAREER-1253024 awarded by the National Science Foundation. The government has certain rights in the invention.

FIELD

The subject matter disclosed herein relates to memory relocation and more particularly relates to dynamic memory relocation.

BACKGROUND

Description of the Related Art

A semiconductor device may use multiple memory controllers to interface with memory devices. Some memory controllers may provide data to a node more rapidly than others.

BRIEF SUMMARY

A method for dynamic memory relocation is disclosed. A tracking module tracks accesses to a plurality of memory devices. Each of the plurality of memory devices is in communication with one memory controller of a plurality of memory controllers embedded in a computing device comprising a plurality of nodes. A migration module migrates first data from a first memory device in communication with a first memory controller to a second memory device in communication with a second memory controller. A semiconductor device and apparatus are also disclosed.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 4 is a schematic block diagram illustrating one embodiment of a data address;

FIG. 5 is a schematic block diagram illustrating one embodiment of a memory address;

FIG. 6 is a schematic block diagram illustrating one embodiment of a profile table;

DETAILED DESCRIPTION OF THE INVENTION

Figure 1:
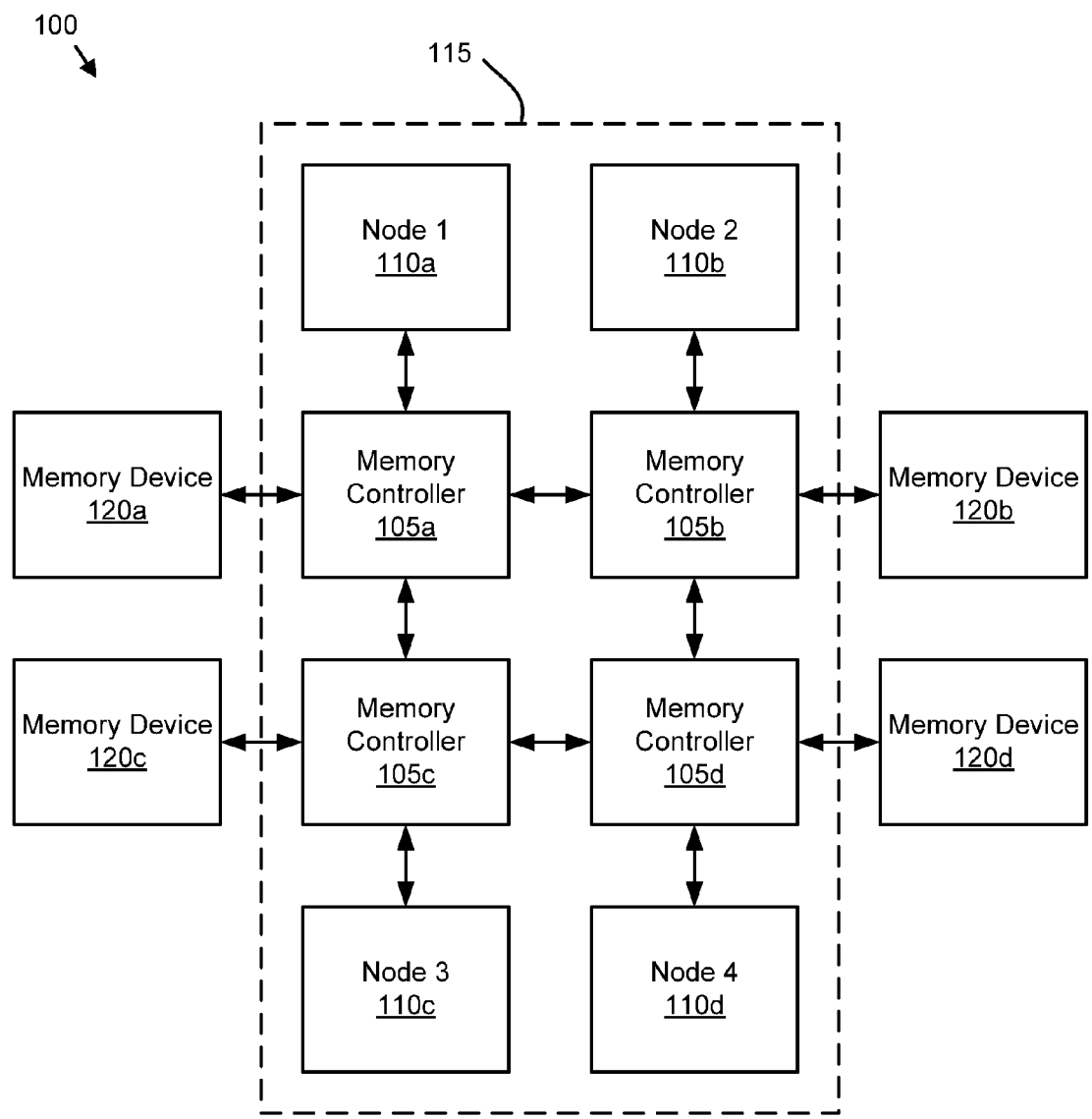
FIG. 1 is a schematic block diagram illustrating one embodiment of a computing device.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of embodiments as set forth hereinafter. As will be appreciated by one skilled in the art, aspects of the present invention may be embodied as a system, method, and/or computer program product. Accordingly, aspects of the present invention may take the form of an entirely hardware embodiment, an entirely software embodiment (including program code, firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having computer readable program code embodied thereon. The computer readable medium may be a non-transitory computer readable storage medium.

Aspects of the embodiments are described below with reference to schematic flowchart diagrams and/or schematic block diagrams of methods, apparatuses, systems, and computer program products according to embodiments of the invention. It will be understood that each block of the schematic flowchart diagrams and/or schematic block diagrams, and combinations of blocks in the schematic flowchart diagrams and/or schematic block diagrams, can be implemented by computer readable program code. The computer readable program code may be provided to a processor of a general purpose computer, special purpose computer, sequencer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and computer readable program code.

The description of elements in each figure may refer to elements of proceeding figures. Like numbers refer to like elements in all figures, including alternate embodiments of like elements. Ancajas, Dean Michael et al., "DMR3D: Dynamic Memory Relocation in 3D Multicore System" (Ancajas) is incorporated herein in its entirety.

FIG. 1 is a schematic block diagram illustrating one embodiment of a computing device 100. The computing device 100 may be a semiconductor device. The device 100 includes one or more nodes 110. In one embodiment, each node 110 includes one or more processor cores. The device 100 further includes one or more memory controllers 105 and one or more memory devices 120. The nodes 110 may access instructions and data, hereafter referred to as data, from the memory devices 120 using the memory controllers 105 to access the data. As used herein, accessing data refers to reading, writing, and/or deleting the data.

In one embodiment, the memory controllers 105 and nodes 110 are embodied within a single semiconductor substrate 115. The memory devices 120 may be in communication with the memory controllers 105 through vertical connections. The vertical connections may be die stacking connections. For example, a memory device semiconductor may be disposed on and electrically connected to the device semiconductor substrate 115. In one embodiment, the memory device semiconductor may connect to the device semiconductor using through silicon vias (TSV).

A fourth node 110d may access data through a first memory controller 105a. The first memory controller 105a may receive the data from a first memory device 120a and communicate the data through the second memory controller 105b and/or the third memory controller 105c to the fourth memory controller 105d. The fourth memory controller 105d may then communicate the data to the fourth node 110d. However, the fourth node 110d may access data stored on the fourth memory device 120d more rapidly directly from the fourth memory controller 105d as the data is communicated directly from the fourth memory controller 105d to the fourth node 110d.

As a result, storing data that is frequently used by a node 110 in a memory device 120 in direct communication with a memory controller 105 with more rapid communications with the node 110 accelerates computing device performance. The embodiments described herein track accesses to the memory devices 120 and migrate data from a first memory device 120 in communication with the first memory controller 105a to a second memory device 120 in communication with a second memory controller 105b to accelerate a node's access to the data as will be described hereafter.

Figure 2:
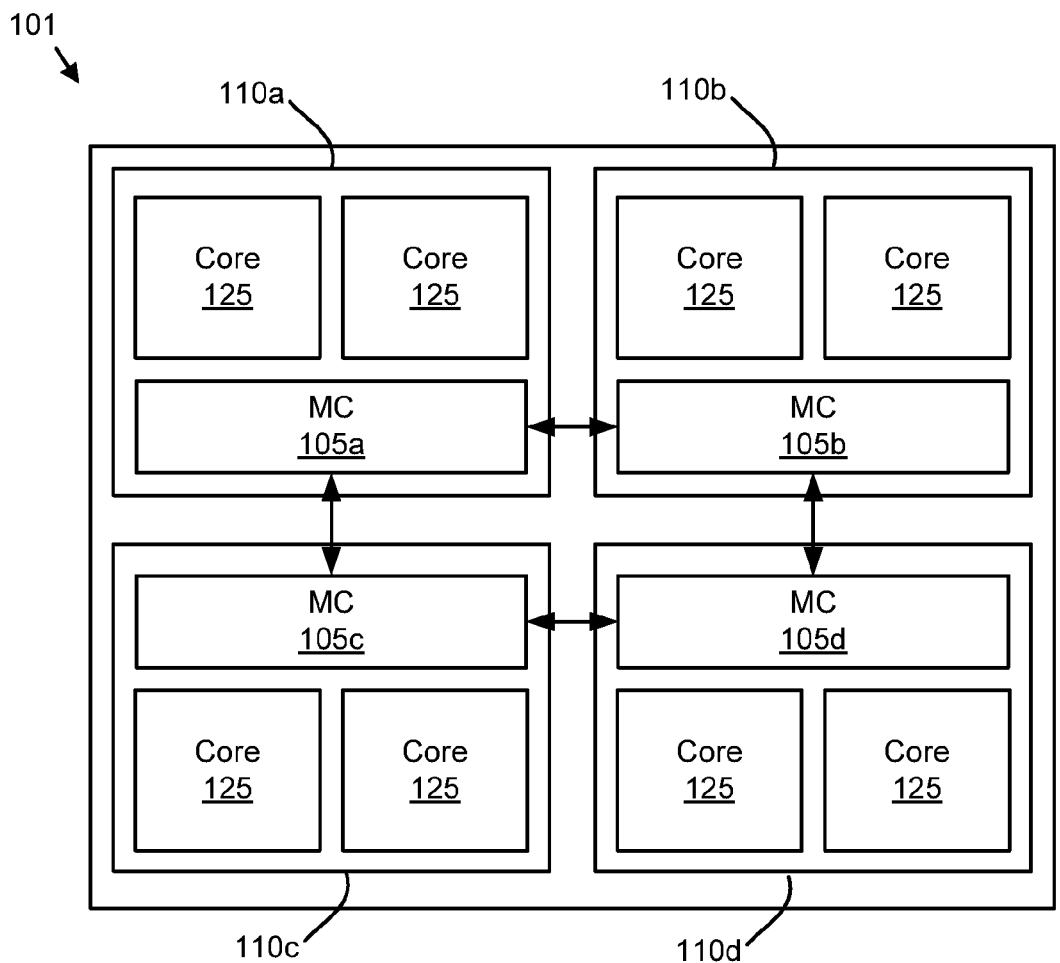
FIG. 2 is a schematic block diagram illustrating one alternate embodiment of a computing device.

FIG. 2 is a schematic block diagram illustrating one alternate embodiment of a computing device 101. The device 101 includes one or more nodes 110. Each node 110 includes one or more cores 125 and a memory controller 105. The cores 125 access data from a memory device (not shown) through a memory controller 105. The cores 125 may be processor cores.

If the data requested by a core 125 does not reside on the memory device 120 in direct communication with the memory controller 105 of the core's node 110, the data may be access using another memory controller 105. However, there is additional delay in accessing the data because of the overhead of communications between one or more memory controllers 105.

If the data accessed by a node 110 and/or node core 125 resides on a memory device 120 that is in direct communication of the memory controller 105 of that node 110, the data access is a local data access. The local data access may also be referred to as a zero hop data access, with the number of hops referring to the number of additional memory controllers 105 participating in the data access.

If the data accessed by the node 110 and/or node core 125 resides on a memory device 120 that is in communication with a memory controller 105 that is in direct communication with the memory controller 105 of the accessing node 110, then the data access is a neighbor data access. The neighbor data access may also be referred to as a one hop data access. If the data access by the node 110 and/or node core 125 resides on a memory device 120 that is in communication with a memory controller 105 that is only in communication with memory controller 105 of the accessing node 110 through at least one intervening memory controller 105, then the data access is a remote data access.

For example, if a core 125 of the first node 110a accesses data from a memory device 120 in direct communication with the first memory controller 105a, the access is a local data access or zero hop data access. If the core 125 of the first node 110a accesses data from a memory device 120 in direct communication with the second memory controller 105b, the access is a neighbor data access or one hop data access. If the core 125 of the first node 110a accesses data from a memory device 120 in direct communication with the fourth memory controller 105d, the access is a remote data access or a two hop data access.

Figure 3:
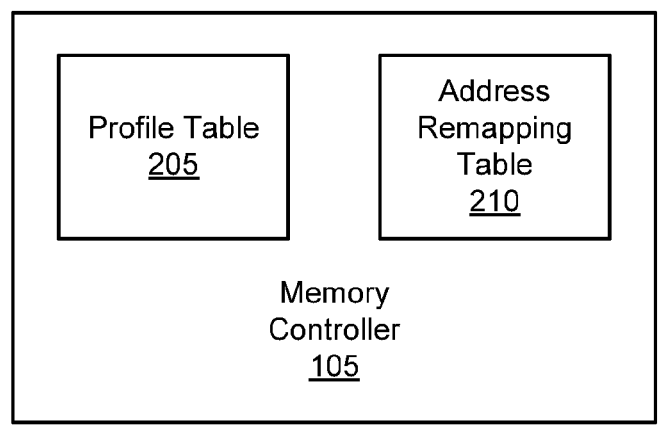
FIG. 3 is a schematic block diagram illustrating one embodiment of a memory controller.

FIG. 3 is a schematic block diagram illustrating one embodiment of a memory controller 105. The memory controller 105 includes a profile table 205 and an address remapping table 210. The profile table 205 may track accesses to the memory devices 120. The profile table 205 will be discussed in more detail in FIG. 6. The address remapping table 210 may catalog the locations of data in the memory devices 120 will be discussed in more detail in FIG. 7.

FIG. 4 is a schematic block diagram illustrating one embodiment of a data address 225. The data address 225 is used to address and access data in a memory device 120. The data address 225 includes a memory controller identifier 295 and a memory address. The memory controller identifier 295 identifies the memory controller in direct communication with the memory device 120 storing the data. For example, a first memory controller 105a may be identified as "00b," a second memory controller 105b as "01b," a third memory controller 105c as "10b," and a fourth memory controller 105d as "11b."

The memory address 240 may address data within one or more memory devices 120. In one embodiment, the memory address 240 is an address range.

In one embodiment, a first memory address 240 addresses data within memory devices 120 for each of the memory controllers 105. Thus the memory controller identifier 295 is required to distinguish between first data stored in a first memory device 120a in communication with the first memory controller 105a and second data stored in a second memory device 120b in communication with the second memory controller 105b.

FIG. 5 is a schematic block diagram illustrating one embodiment of a memory address 240. The memory address 240 is depicted as including a bank identifier 255 that indicates a bank of the memory device 120, a row identifier 260 that indicates a row with the bank, a column identifier 265 that indicates a column with the bank, and a byte offset, indicating an offset from the row and column address. In one embodiment, the memory address 240 is two addresses, indicating both a start and an end address of a range.

In one embodiment, the bank identifier 255 and the row identifier 260 comprises a page number 275. In addition, the column identifier 265 and the byte offset may comprise a page offset 285.

FIG. 6 is a schematic block diagram illustrating one embodiment of a profile table 205. The profile table 205 may include a plurality of profile table entries 235. In the depicted embodiment, the profile table entry 235 includes a node/mc identifier 215, an access type 220, a data address 225, and an access count. In one embodiment, the data address 225 is the page number 275, with the page offset 285 set to a base value such as all zeros.

The node/mc identifier 215 may identify the memory controller 105 of the node 110 and/or core 125 accessing the data at the data address 225. Alternatively, the node/mc identifier 215 may identify the node 110 of the core 125 accessing the data at the data address 225. In one embodiment, the node/mc identifier 215 identifies the core 125 accessing the data, the node 110 of the core 125 accessing the data, the memory controller 105 of the core 125 and/or node 110 accessing the data, or combinations thereof.

In one embodiment, the profile table 205 is updated each time a core 125 and/or node 110 accesses data in a memory device 120. A data access may include, but is not limited to, a read operation, a write operation, and a delete operation. In one embodiment, the data address 225 is an address range for storage spaces with a memory device 120. The profile table 205 may be updated each time there is a data access within the data range.

If the core 125 and/or node 110 accesses the data address 225 for the first time, a profile table entry 235 for the access may be created. In one embodiment, the access count 230 is initialized to a value such as zero or one when the profile table entry 235 is created. In addition, the node/mc identifier 215 may be initialized to identify the core 125 and/or node 110 accessing the data address 225. The access type 220 may also be set indicate whether the data access is a local data access, a neighbor data access, or a remote data access. In one embodiment, the access type 220 records a number of hops for the data access.

If the core 125 and/or node 110 further accesses the data address 225, the access count 230 may be incremented for each additional access. In one embodiment, the access count 230 is incremented with a quantity of data transferred during the access.

Profile table entries 235 may be created for each node 110 and/or core 125 that access the data address 225. Thus a first profile table entry 235a may be created for a first node 110a accessing first data and a second profile table entry 235b may be created for a second node 110b accessing the same first data.

Figure 7:
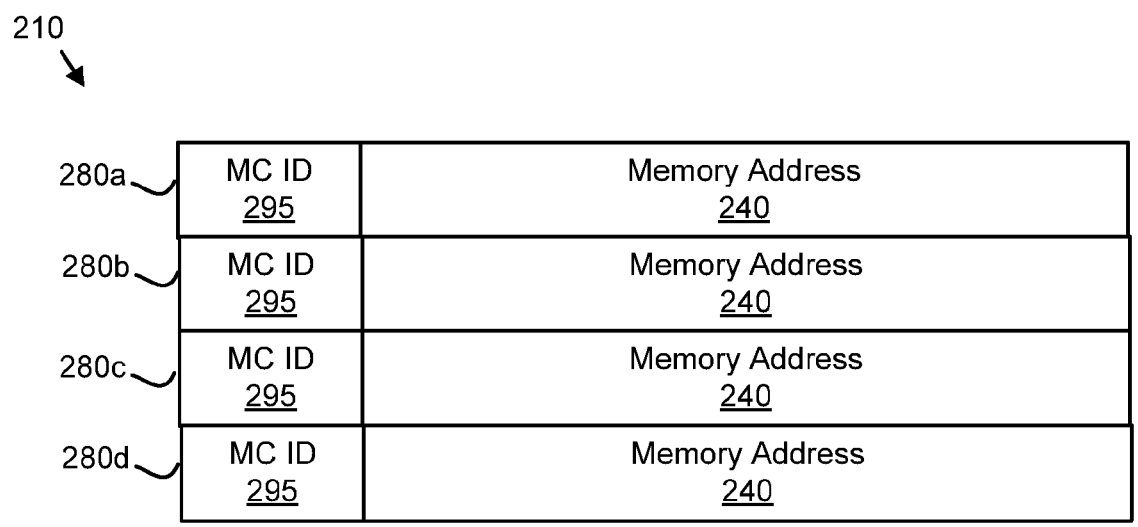
FIG. 7 is a schematic block diagram illustrating one embodiment of an address remapping table.

FIG. 7 is a schematic block diagram illustrating one embodiment of an address remapping table 210. The address remapping table 210 catalogs locations of data in the memory devices 120. In the depicted embodiment, the address remapping table includes a plurality of mapping entries 280. Each mapping entry may include a memory controller identifier 295 and a memory address 240. The memory address 240 may be a page number 275, with the page offset set to zeros. The memory address 240 may also indicate a beginning address of data in a memory device 120. Alternatively, the memory address 240 may be an address range.

In one embodiment, data may be migrated from a first memory device 120a in communication with a first memory controller 105a to a second memory device 120b in communication with a second memory controller 105b. The memory controller identifier 295 may be updated to indicate that the data is subsequently accessed through the second memory controller 105b. In one embodiment, the data may be migrated to the address of the second memory device 120b indicated by the memory address 240. Alternatively, the data may be migrated to a new address and the memory address 240 may be updated to reflect the new address.

Figure 8:
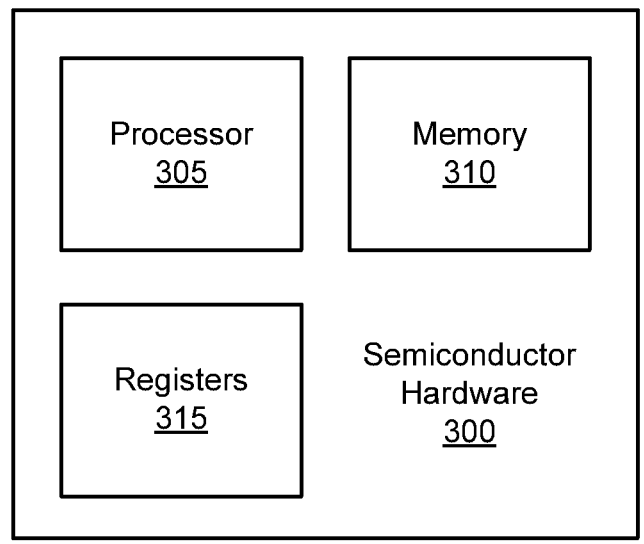
FIG. 8 is a schematic block diagram illustrating one embodiment of semiconductor hardware.

FIG. 8 is a schematic block diagram illustrating one embodiment of semiconductor hardware 300. The hardware 300 may be embodied in computing device 100. The hardware 300 includes a processor 305, a memory 310, and registers. The processor 305 may be a sequencer. The memory 310 may be a microcode store. The registers 315 may storing working values. In one embodiment, the memory stores program code that is executed by the processor 305 to perform functions as will be described hereafter.

Figure 9:
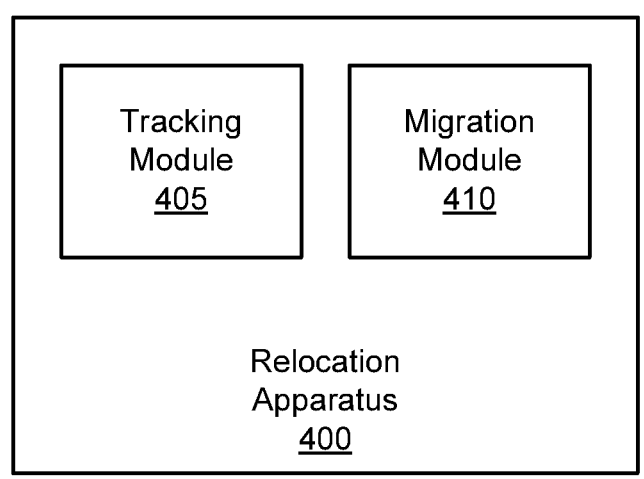
FIG. 9 is a schematic block diagram illustrating one embodiment of a relocation apparatus.

FIG. 9 is a schematic block diagram illustrating one embodiment of a relocation apparatus 400. The apparatus 400 may be embodied in the semiconductor hardware 105. The apparatus includes a tracking module 405 and a migration module 410. The tracking module 405 may track accesses to the plurality of memory devices 120. The migration module 410 may migrate data from a first memory device 120a in communication with a first memory controller 105a to a second memory device 120b in communication with a second memory controller 105b as will be described hereafter.

Figure 10:
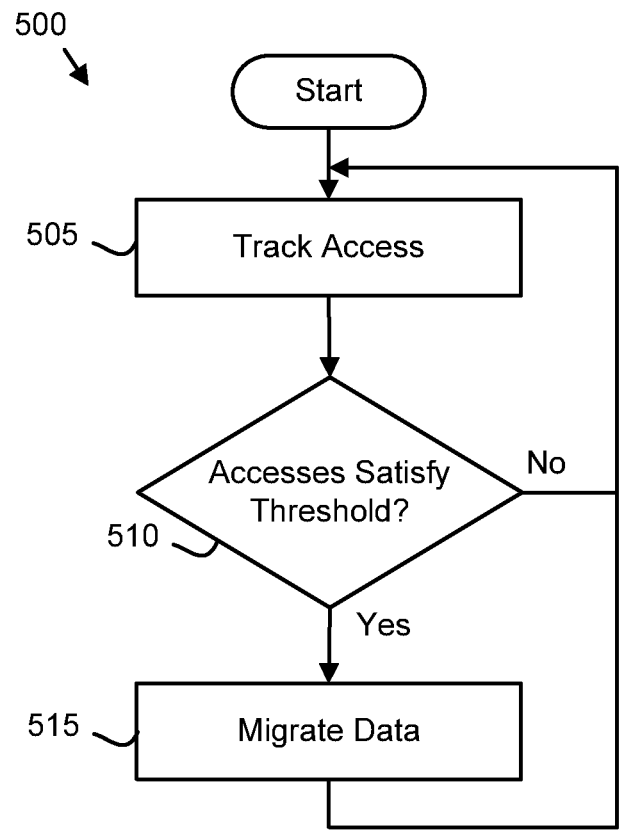
FIG. 10 is a schematic flow chart diagram illustrating one embodiment of a dynamic memory relocation method.

FIG. 10 is a schematic flow chart diagram illustrating one embodiment of a dynamic memory relocation method 500. The method 500 performs the functions of the apparatus 400 and devices 100, 101. The method 500 may be performed by semiconductor gates, a computer readable storage medium, such as the memory 310, storing program code, or combinations thereof.

The method 500 starts, and in one embodiment the tracking module 405 tracks 505 accesses to the plurality of memory devices 120. Each of the memory devices 120 is in communication with one memory controller 105 of the plurality of memory controllers 105 embedded in the computing device 100, 101. The computing device 100, 101 includes a plurality of nodes 110. Alternatively, the computing device 100, 101 includes a plurality of cores 125, a plurality of nodes 110, or combinations thereof.

In one embodiment, accesses are tracked 505 by recording each access as a profile table entry 235. The tracking module 405 may create a profile table entry 235 for data accessed by a node 110 and/or core 125. If data is accessed by two or more nodes 110, profile table entries 235 may be created for each node 110.

In addition, the tracking module 405 may increment the access count 230 for each subsequent access of the data. In one embodiment, the access count 230 is incremented with specified value, such as one. Alternatively, the access count 230 may be incremented with a quantity, such as a quantity of data accessed, a time required for the data access, or the like.

In one embodiment, the access counts 230 are periodically reset. For example, the access counts 230 may be reset at an epoch boundary. An epoch may be a specified time interval, a specified number of clock cycles, a specified number of transactions, or the like.

The migration module 410 may determine 510 if accesses to first data in a first memory device 120a that is in communication with the first memory controller 105a satisfies an access threshold for a second memory controller 105b and/or the node 110 and/or core 125 associated with the second memory controller 105b. For example, the migration module 410 may consult the profile table entry 235 for the second memory controller 105b and the first data as indicated by the node/mc identifier 215 and the data address 225 in the profile table entry 235. If the access count 230 of the profile table entry 235 exceeds the access threshold, the first data satisfies the access threshold for the second memory controller 105.

In one embodiment, the access threshold is a number of accesses during the epoch. Alternatively, the access threshold may be a total quantity of the first data accessed during the epoch. In a certain embodiment, the access threshold is a total time required to access the first data during the epoch.

If the first data satisfies the access threshold for two or more memory controllers 105, the memory controller 105 with the largest access count 230 may be selected as satisfying the access threshold.

If the accesses do not satisfy the access threshold, the tracking module 405 continues to track 505 accesses. If the accesses satisfy the access threshold, the migration module 410 may migrate 515 the first data from the first memory device 120a in communication with the first memory controller 105a to a second memory device 120b in communication with the second memory controller 105b. One embodiment of the migration 515 of the first data is described in FIG. 11.

In one embodiment, the second memory controller 105b and associated second memory device 120b is selected as a function of the access count 230 for each node 110 and memory controller 105 that accesses the data address 225. In one embodiment, a weighted hop count HC is calculated for each 110 and memory controller 105 that accesses the data address 225 using Equation 1, where ATH is hops of the access type 220 and AC is the access count 230.

$$HC = ATH*AC \quad \text{Equation 1}$$

The node 110 and associated memory controller 105 with the greatest weighted hop count may be selected for migration of the first data. In one embodiment, the first data is migrated 515 at a boundary of an epoch. The epoch boundary may be a start of an epoch, an end of an epoch, or the like.

By regularly migrating data to memory controllers 105 in more rapid communication with nodes 110 accessing the data, the performance of the computing device 100, 101 may be accelerated. Subsequent to migrating 515 the first data, the first data is more rapidly accessed by the second node 110b and/or the cores 125 of the second node 110b as the second memory controller 105b communicates more rapidly with the second node 110b and accesses of the first data are local data accesses for the second node 110b.

Figure 11:
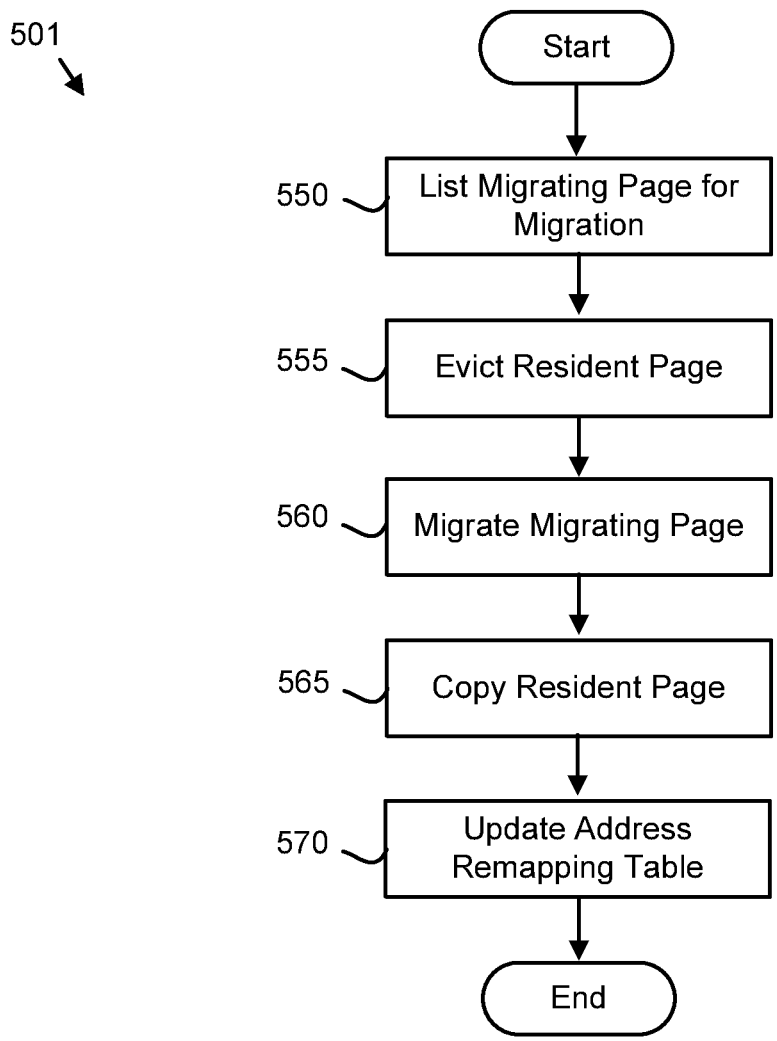
FIG. 11 is a schematic flow chart diagram illustrating one embodiment of a migration method.

FIG. 11 is a schematic flow chart diagram illustrating one embodiment of a migration method 501. The method 501 performs the functions of the apparatus 400 and devices 100, 101. The method 501 may be performed by semiconductor gates, a computer readable storage medium, such as the memory 310, storing program code, or combinations thereof.

The method 501 starts, and in one embodiment, the migration module 410 lists 550 a migrating page for the first data that is to be migrated. The migrating page may be indicated by a memory controller identifier 295 and a page number 275 of the first data. Alternatively, the migrating page may be indicated by a data address 225 and/or a memory controller identifier 295 and a memory address 240.

The migration module 410 may evict 555 resident data that resides at the migrating page page number 275 and/or memory address 240 of a second memory device 120b in direct communication with the second memory controller 105b. The resident data may have the same page number 275 and/or memory address 240 as the first data. As a result, a data address 225 for the resident data may be formed from the memory controller identifier 295 of the second memory controller 105b and the page number 275 and/or memory address 240 of the migrating page. In one embodiment, the migration module 410 evicts the resident data by copying the resident data to a new data address 225.

The migration module 410 further migrates 560 the migrating page. In one embodiment, the migration module 410 copies the first data and/or page containing the first data to the data address 225 formed by the memory controller identifier 295 of the second memory controller 105b and the page number 275 and/or memory address 240 of the first data.

In addition, the migration module 410 copies 565 the resident data from the new data address 225 to a page in the first memory device 120a addressed by memory controller identifier 295 of the first memory controller 105a and the page number 275 and/or memory address 240 of the first data and/or migrating page. Thus the first data and the resident data have swapped storage spaces.

The migration module 410 further updates 570 the address remapping table 210. In one embodiment, the memory controller identifier 295 for the first data is changed to indicate the second memory controller 105b and the memory controller identifier 295 for the resident data is changed to indicate the first memory controller 105a.

By migrating the data to memory devices 120 associated with memory controllers in more direct communication with nodes 110 and/or cores 125 accessing the data, the performance of the nodes 110 and/or cores 125 is increased. Swapping the first data with the resident data further simplifies the migration of the data.

The embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for dynamic memory relocation comprising:
tracking accesses to a plurality of memory devices in a profile table, wherein each of the plurality of memory devices is in communication with one memory controller of a plurality of memory controllers embedded in a computing device comprising a plurality of nodes, each memory controller is in communication with one node and at least one other memory controller, and the profile table records an access count of accesses for a data address by each node and an access type that specifies a number of hops between memory controllers for the data from the data address to reach the node;
calculating a weighted hop count for each memory controller for first data at a first data address in a first memory device; and
migrating the first data from the first memory device in communication with a first memory controller to a second memory device in communication with a second memory controller in response to the weighted hop count for the second memory controller exceeding the weighted hop count for the first memory controller.

2. The method of claim 1, wherein the memory controllers are connected to the memory devices through vertical connections.

3. The method of claim 1, wherein the first data is migrated at an epoch boundary.

4. The method of claim 1, wherein the profile table comprises a node/memory controller identifier.

5. The method of claim 1, wherein locations of data in the memory devices are cataloged with an address remapping table and each location comprises a memory controller identifier and a memory address.

6. The method of claim 1, wherein migrating the first data comprises:
listing a migrating page storing the first data for migration;
evicting a resident page from the second memory device;
migrating the migrating page to the second memory device; and
copying the resident page to the first memory device.

7. A semiconductor device comprising:
a tracking module that tracks accesses to a plurality of memory devices in a profile table, wherein each of the plurality of memory devices is in communication with one memory controller of a plurality of memory controllers embedded in the semiconductor device, the semiconductor device comprising a plurality of nodes, each memory controller is in communication with one node and at least one other memory controller, and the profile table records an access count of accesses for a data address by each node and an access type that specifies a number of hops between memory controllers for the data from the data address to reach the node, and the tracking module calculating a weighted hop count for each memory controller for first data at a first data address in a first memory device; and
a migration module that migrates the first data from the first memory device in communication with a first memory controller to a second memory device in communication with a second memory controller in response to the weighted hop count for the second memory controller exceeding the weighted hop count for the first memory controller.

8. The semiconductor device of claim 7, wherein the memory controllers are connected to the memory devices through vertical connections.

9. The semiconductor device of claim 7, wherein the first data is migrated at an epoch boundary.

10. The semiconductor device of claim 7, wherein the profile table comprises a node/memory controller identifier.

11. The semiconductor device of claim 7, wherein locations of data in the memory devices are cataloged with an address remapping table and each location comprises a memory controller identifier and a memory address.

12. The semiconductor device of claim 7, wherein migrating the first data comprises:
listing a migrating page storing the first data for migration;
evicting a resident page from the second memory device;
migrating the migrating page to the second memory device; and
copying the resident page to the first memory device.

13. An apparatus comprising:
a non-transitory memory storing program code executable by a processor, the program code comprising:
a tracking module that tracks accesses to a plurality of memory devices in a profile table, wherein each of the plurality of memory devices is in communication with one memory controller of a plurality of memory controllers embedded in a computing device comprising a plurality of nodes, each memory controller is in communication with one node and at least one other memory controller, and the profile table records an access count of accesses for a data address by each node and an access type that specifies a number of hops between memory controllers for the data from the data address to reach the node, and the tracking module calculating a weighted hop count for each memory controller for first data at a first data address in a first memory device; and
a migration module that migrates the first data from the first memory device in communication with a first memory controller to a second memory device in communication with a second memory controller in response to the weighted hop count for the second memory controller exceeding the weighted hop count for the first memory controller.

14. The apparatus of claim 13, wherein the memory controllers are connected to the memory devices through vertical connections.

15. The apparatus of claim 13, wherein the first data is migrated at an epoch boundary.

16. The apparatus of claim 13, wherein the profile table comprises a node/memory controller identifier.

17. The apparatus of claim 13, wherein locations of data in the memory devices are cataloged with an address remapping table and each location comprises a memory controller identifier and a memory address.

* * * * *